No. 827,852. PATENTED AUG. 7, 1906.
H. G. COX.
STOKER.
APPLICATION FILED JUNE 4, 1904.

6 SHEETS—SHEET 1.

Witnesses
J.A.Walsh.
Ruth Worthington.

Inventor
Henry G. Cox.
By
Bradford & Hood
Attorneys

No. 827,852. PATENTED AUG. 7, 1906.
H. G. COX.
STOKER.
APPLICATION FILED JUNE 4, 1904.

6 SHEETS—SHEET 2.

Witnesses
J. A. Walsh.
Ruth Worthington

Inventor
Henry G. Cox.
By
Bradford & Hood
Attorneys

No. 827,852. PATENTED AUG. 7, 1906.
H. G. COX.
STOKER.
APPLICATION FILED JUNE 4, 1904.

6 SHEETS—SHEET 3.

Witnesses
J. A. Walsh
Ruth Worthington

Inventor
Henry G. Cox.
By
Bradford Hood
Attorneys

No. 827,852. PATENTED AUG. 7, 1906.
H. G. COX.
STOKER.
APPLICATION FILED JUNE 4, 1904.

6 SHEETS—SHEET 4.

Witnesses
J. A. Walsh.
Ruth Worthington.

Inventor
Henry G. Cox.
By Bradford & Hood
Attorneys

No. 827,852. PATENTED AUG. 7, 1906.
H. G. COX.
STOKER.
APPLICATION FILED JUNE 4, 1904.
6 SHEETS—SHEET 5.

Witnesses
J. A. Walsh
Ruth Worthington

Inventor
Henry G. Cox
By Bradford & Hood
Attorneys

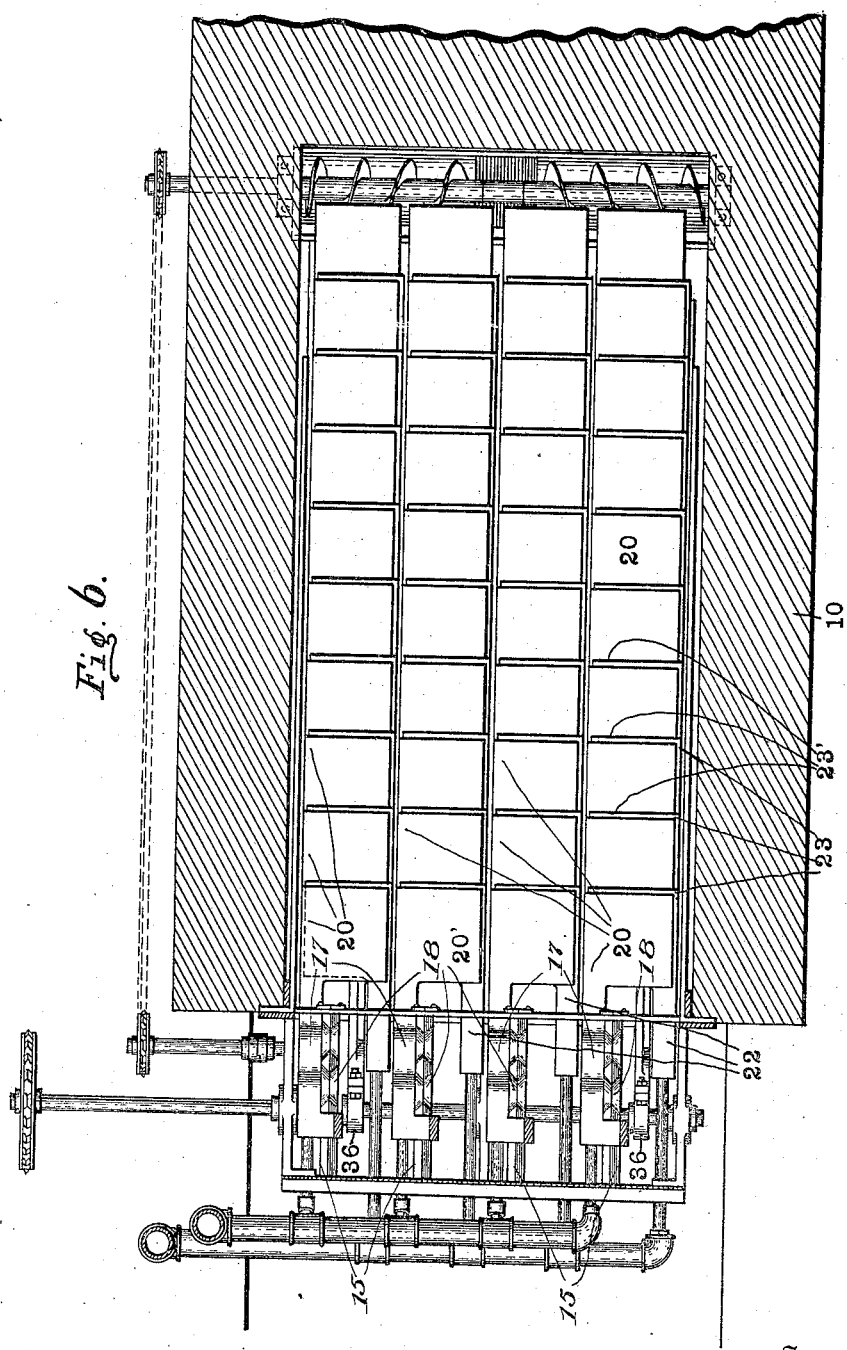

UNITED STATES PATENT OFFICE.

HENRY G. COX, OF INDIANAPOLIS, INDIANA, ASSIGNOR TO JOHN T. BRUSH, OF INDIANAPOLIS, INDIANA.

STOKER.

No. 827,852.　　Specification of Letters Patent.　　Patented Aug. 7, 1906.

Application filed June 4, 1904. Serial No. 211,141.

*To all whom it may concern:*

Be it known that I, HENRY G. COX, a citizen of the United States, residing at Indianapolis, in the county of Marion and State of Indiana, have invented certain new and useful Improvements in Stokers, of which the following is a specification.

The object of my invention is to produce a positive feed-stoker which shall be automatic and self-cleaning and of such character as to be practically indestructible and capable of maintaining a smokeless fire, the apparatus being especially adapted to marine boilers, but not limited to such use.

In detail my objects are to produce an automatic stoking mechanism in which the grate members may be water-cooled, to provide an improved form of support and driving mechanism for said grate members, to so combine and arrange the parts of the entire mechanism that the apparatus as a unit may be readily withdrawable from any boiler or setting, and to provide such improvements in details of construction as shall be hereinafter pointed out.

Figure 7:
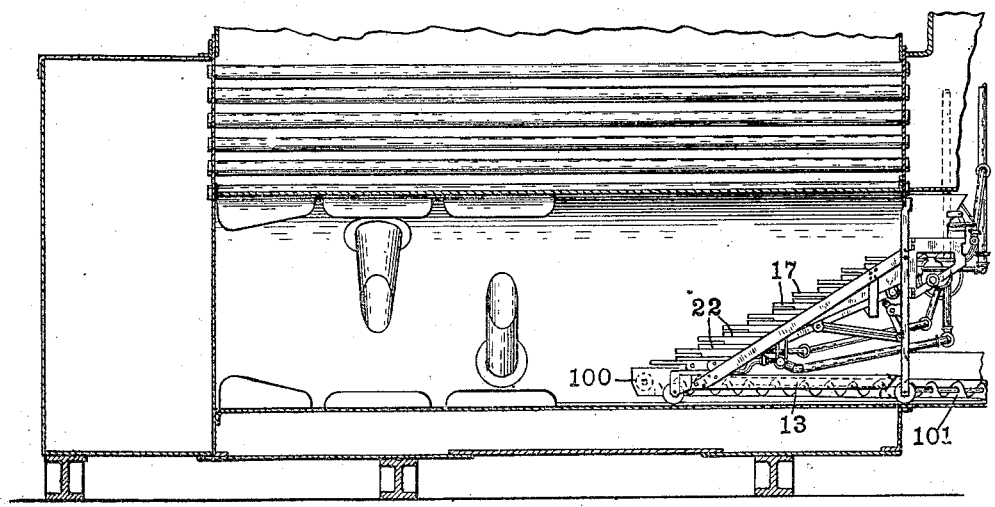

The accompanying drawings illustrate my invention, all but Figure 7 thereof showing the apparatus as applied to an ordinary fire-tube boiler.

Figure 1:
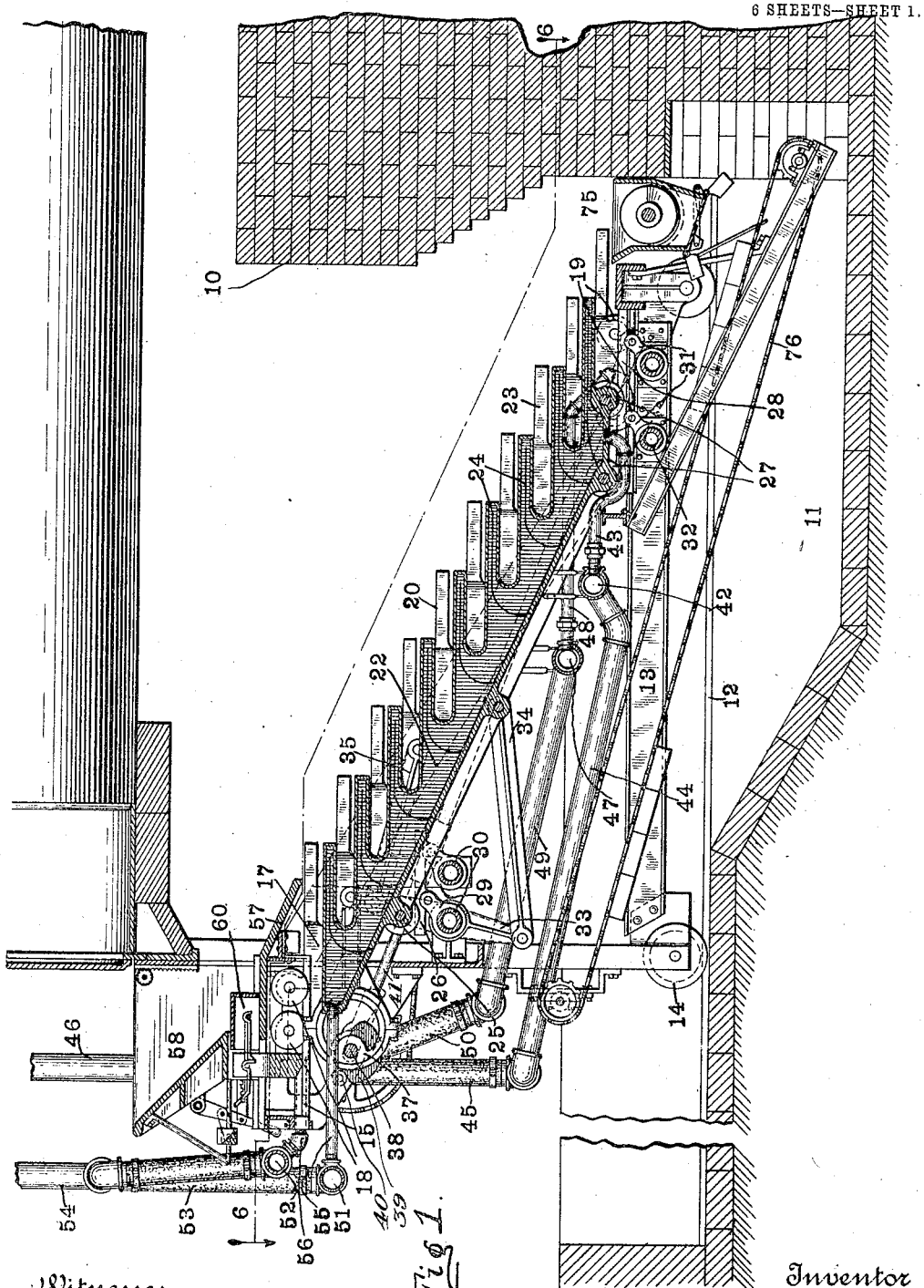
Figure 2:
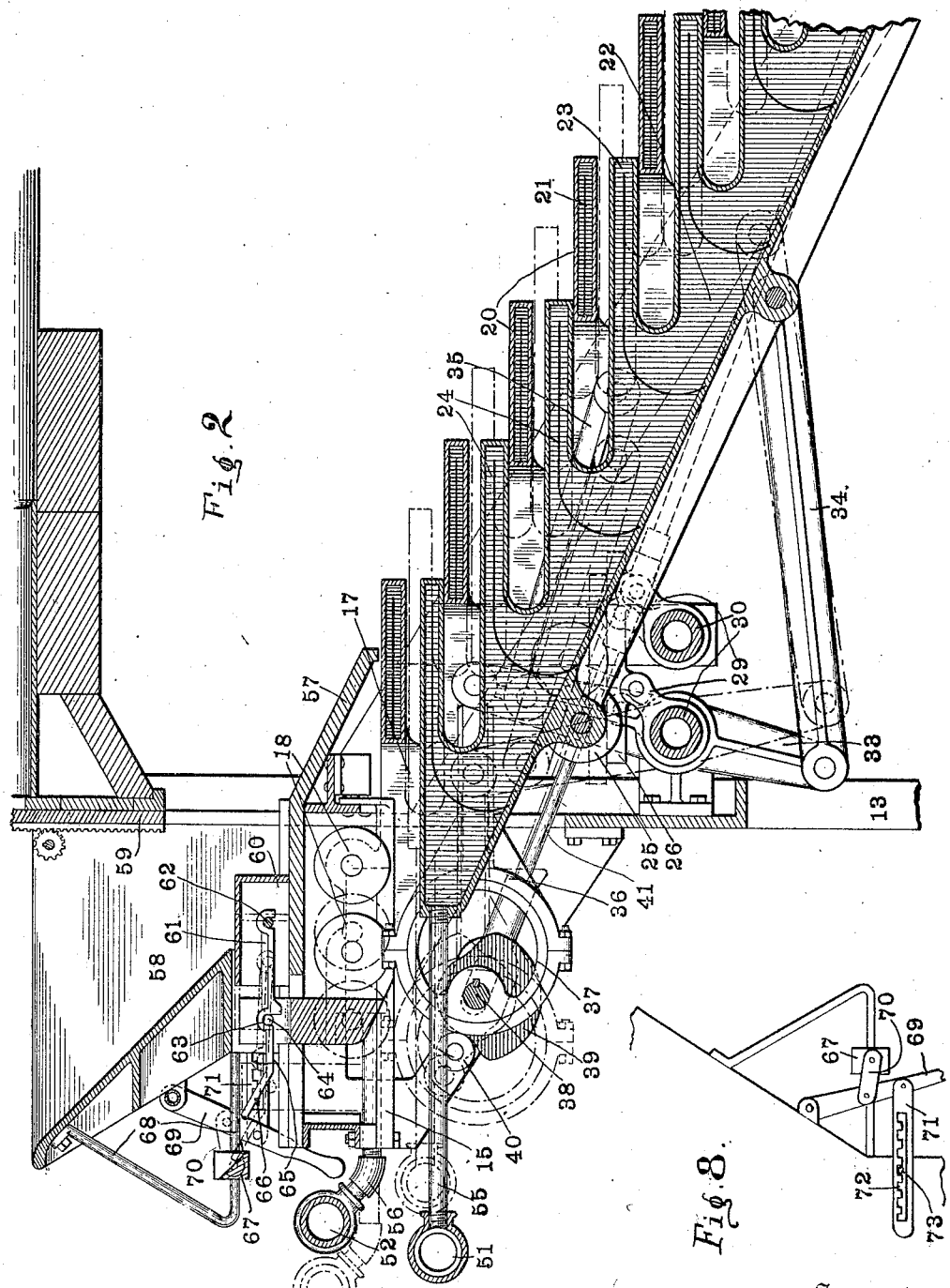
Figure 3:
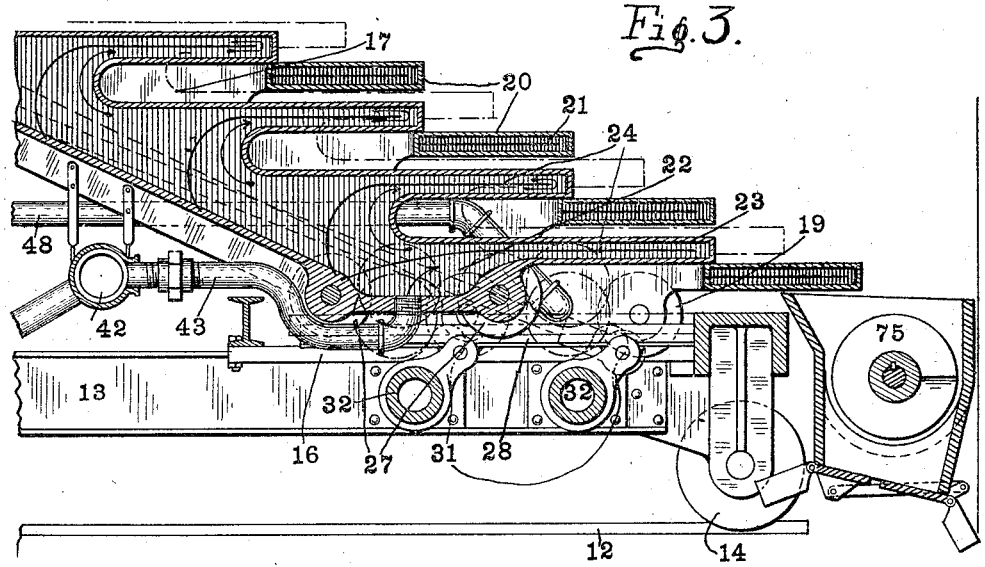
Figure 4:
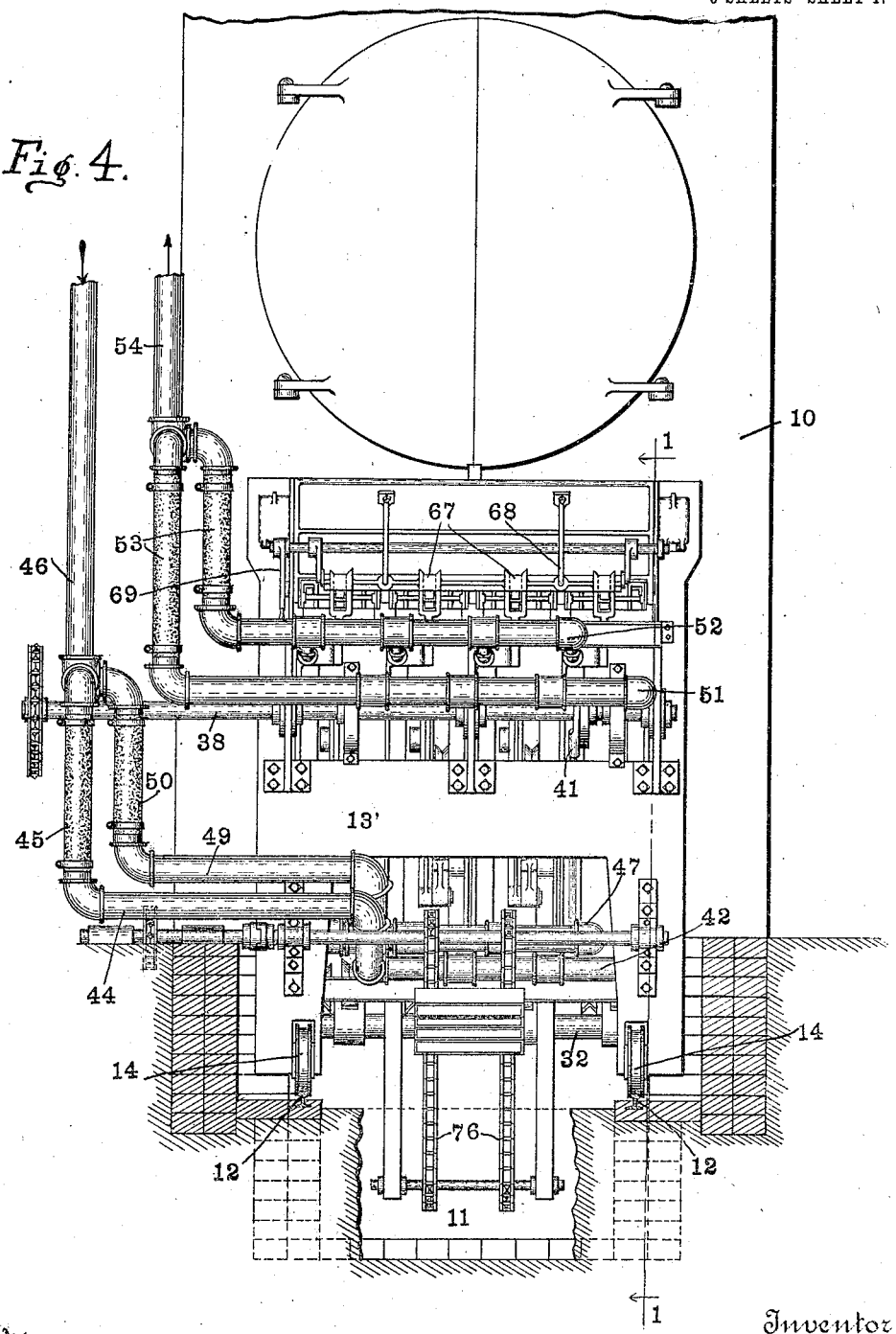
Figure 5:
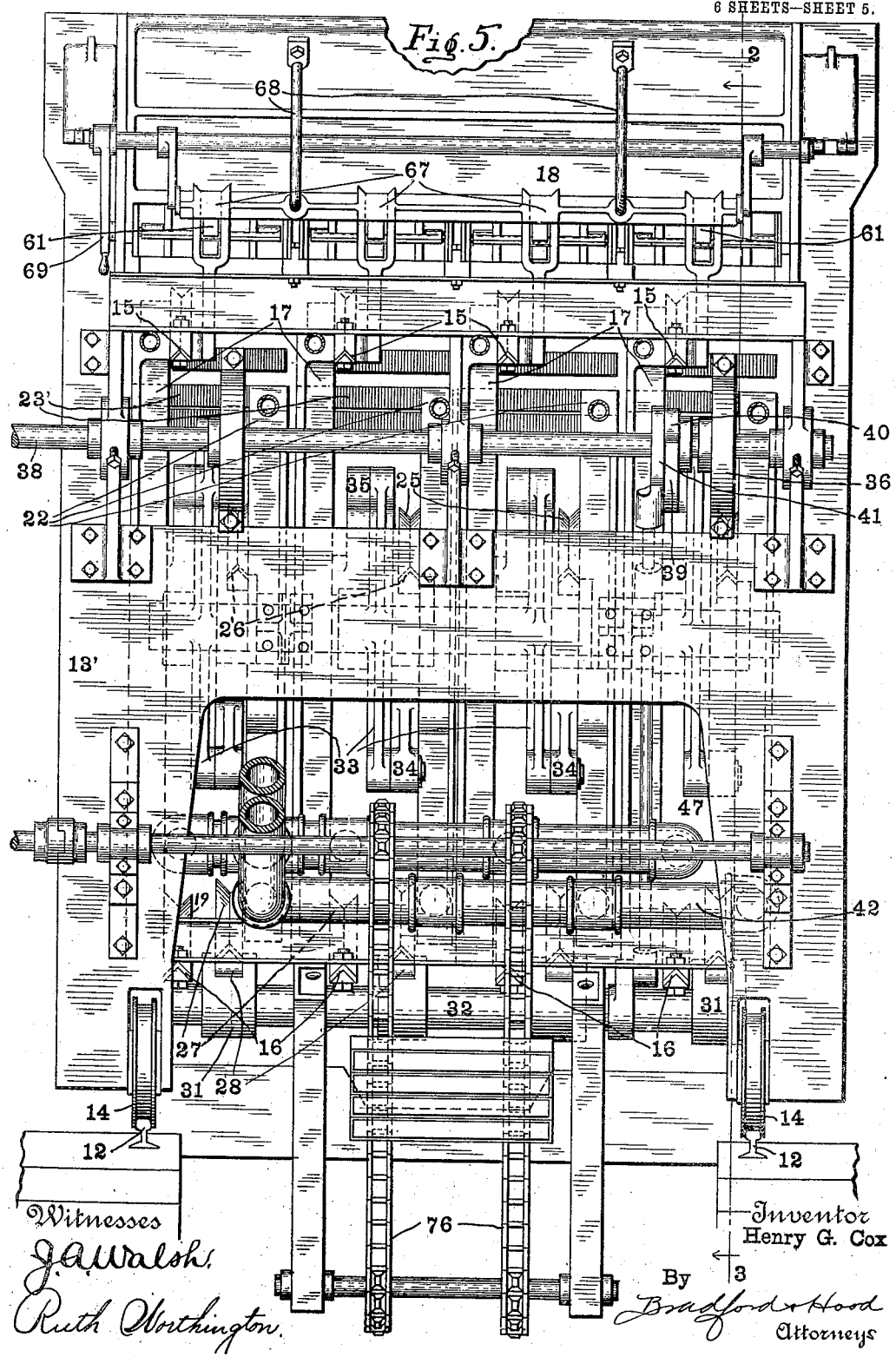

Fig. 1 is a vertical section approximately on line 1 1 of Fig. 4, the cutting-plane being laterally displaced in portions sufficient to cut the transverse water-circulation pipes, a portion of the supporting-frame, and the track-supporting shafts for the sake of clearness. Figs. 2 and 3 constitute a vertical section similar to that shown in Fig. 1, on a larger scale, on line 2 3 of Fig. 5, the cutting-plane being sufficiently displaced with relation to the frame 13 so as to cut only the cross-bar thereof shown in Fig. 5. Fig. 4 is a front elevation; Fig. 5, a front elevation on a larger scale; Fig. 6, a plan section on line 6 6 of Fig. 1; Fig. 7, a diagrammatic section showing one application of my device to a marine type of boiler, and Fig. 8 a detail.

In the drawings, 10 indicates a boiler-setting of any desired type, and in place of the usual combustion-chamber, provided with the ordinary grate-bars, &c., I form in the bottom of said combustion-chamber a narrow longitudinal pit 11 for the reception of a peculiar ash-discharger which forms the subject-matter of a companion application. Arranged in each side of pit 11 and running axially beneath the boiler is a pair of tracks 12, upon which my apparatus is mounted.

The main frame 13 of the device is provided with suitable supporting-rollers 14, which rest upon tracks 12, whereby the entire apparatus may be easily withdrawn from beneath the boiler and easily returned to position. The frame 13 is substantially triangular in side elevation, and arranged at the upper outer corner and the inner corner or apex are stationary horizontal tracks 15 and 16, respectively. Extending between each pair of tracks 15 16 is a horizontally-reciprocatory hollow ram 17, provided at its upper end with a pair of rollers 18, which rest upon track 15, and at its lower end with a pair of rollers 19, which rest upon track 16. The ram 17 consists of a main body from which projects a series of substantially horizontal vertically-separated overlapping fingers 20, each of which is provided with a side extension 20'. The fingers 20 are vertically separated an amount somewhat greater than the total thickness of the fingers, and the forward end of one slightly overlaps the rear edge of the transverse extension of the next lower. The ram 17, together with its fingers, is hollow, and arranged therein and projecting into the fingers is a series of baffle-plates 21, the particular arrangement of which will be more fully described in connection with the coöperating rams.

Arranged parallel with and adjacent each ram 17 is a ram 22, provided with fingers 23, having side extensions 23', the construction of this ram being exactly similar to the ram 17, except that the position of the side extensions is reversed, whereby the side extensions 23' will lie between the fingers 20 of the ram 17 and the side extensions 20' will lie between the fingers 23 of the ram 22. Arranged within the ram 22 are baffle-plates 24, each of which extends forward into one of the hollow fingers 23 and its extension 23', thus providing for a circulation of water through the fingers and their extensions and through the main body of the ram, as indicated by arrows in Figs. 2 and 3. Each ram 22 is provided at its upper end with a roller 25, which rests upon a horizontal track 26, and at its lower end is provided with a pair of rollers 27, which rest upon a horizontal track 28. Each track 26 is pivotally connected to a pair of arms 29 29, carried by a pair of parallel shafts 30 30, the arrangement being such that by shifting one of the shafts angularly the tracks 26 may be simultaneously raised and lowered, as indicated by dotted lines in Fig. 2, but maintained in horizontal position. Similarly each track 28 is pivotally connected to a pair of arms 31 31, carried by a pair of parallel shafts 32 32.

As many pairs of rams 17 and 22 may be arranged beneath the boiler as may be desired, thus forming two sets of rams, one set comprising all the rams 17 and the other set comprising all the rams 22.

For the purpose of reciprocating the two sets of rams horizontally I sleeve upon one of the shafts 30 a plurality of walking-beams 33, one for each pair of rams, and connect one arm of each walking-beam by a link 34 to the adjacent ram 22 and by a link 35 to the adjacent ram 17. Each walking-beam is then connected by an eccentric rod and strap 36 with an eccentric 37, carried by a main drive-shaft 38, the arrangement being such that the horizontal reciprocations of the two rams are in opposite directions. It will be readily understood that, if desired, the several rams 17 may be connected together and the several rams 22 also connected together and then moved by a single walking-beam and eccentric. Mounted upon shaft 38 is a cam 39, adapted to engage a roller 40, carried by a rod 41, which pitman is extended down beneath the rams and connected to one of the arms 29 and one of the arms 31, the arrangement being such that as the shaft 38 rotates the tracks 26 and 28 are raised and lowered, as indicated by dotted lines in Figs. 2 and 3, whereby as the rams are reciprocated the rams 22 will be alternately raised and lowered, as well as horizontally reciprocated, as indicated by dotted lines in said figures.

Arranged beneath the lower ends of the rams is a transverse water-pipe 42, which is provided with a plurality of pipes 43, one of which is let into the bottom of each ram 22 beneath the lowest baffle-plate 24. The pipe 42 is connected by pipe 44 and the flexible pipe 45 (or any other suitable flexible connection) with a main feed-pipe 46 at the front of the setting. Also arranged beneath the lower ends of the rams is a transverse pipe 47, which is provided with a plurality of feeder-pipes 48, each of which is led to the lower end of one of the rams 17 beneath its lowest baffle-plate 21. The pipe 47 is connected by a pipe 49 and flexible connection 50 with the inlet-pipe 46. Arranged across the front of the setting are transverse pipes 51 and 52, which connect by flexible connections 53 with the outlet-pipe 54. Pipe 51 is provided with a series of connecting-pipes 55, each of which leads from the upper end of a ram 22, and pipe 52 is provided with a plurality of pipes 56, each of which leads from the upper end of one of the rams 17, the arrangement being such that a continuous stream of water may flow from pipe 46 into the lower ends of the rams through the fingers and their extensions and from the upper ends of said rams through the outlet-pipe 54.

Leading to the upper finger of each of the several rams 17 is a feed-plate 57, which inclines inwardly and downwardly from a suitable feed-hopper 58, the outlet of which may be controlled by a suitable gate 59. Arranged in the bottom of the hopper 58 and at the upper end of the feed-plate 57 is a series of feeding-plungers 60, adapted to push the fuel in regular small quantities from the hopper onto the feed-plate. These plungers 60 are reciprocated by the rams 17, each plunger being connected to the adjacent ram by means of a link 61, pivoted at 62 to the plunger. Link 61 is provided at an intermediate portion with a pin-receiving socket 63, the rear side of which is shorter than the front side, as clearly shown in Fig. 2. Socket 63 is adapted to receive a pin 64, carried by the adjacent ram 17. Extending to the rear from the short side of socket 63 is a surface 65, along which the pin 64 may at times slide, and rising from the rear end of surface 65 is an upwardly and rearwardly inclined tail 66, which is adapted to engage an inclined track 67 and be thereby raised, so as to swing the link 61 upon pin 62 as a pivot, thereby withdrawing socket 63 from pin 64, so that pin 64 can continue in its rearward motion without pulling the plunger 60 backward through its entire stroke, as is clearly indicated in dotted lines in Fig. 2. In order that the throw of plunger 60 may be adjusted, the tracks 67 are connected and mounted upon horizontal ways 68. Lever 69, connected to tracks 67 by links 70, is then provided with a catch-bar 71, provided with a series of notches 72, any one of which is adapted to receive a stationary pin 73.

Arranged at the lower end of the several sets of rams is an ash-conveyer 75, which discharges the ashes to the ash-conveyer 76, which, as previously stated, forms the subject-matter of a companion application.

The face-plate 13', which forms the base of the frame, is of such size and shape as to form that portion of the face of the setting below the boiler. It will be noticed, therefore, that the entire apparatus may be readily drawn forward on tracks 12 from beneath the boiler and projected out of the setting, so that all of the parts may be readily reached for repair or replacement.

While the construction described thus far has been illustrated in connection with an ordinary fire-tube boiler and setting, it is to be understood, of course, that the stoker is just as applicable to any other type of boiler, any person ordinarily skilled in the art being capable of applying the stoker to different types of boilers. In Fig. 7 I have shown the stoker applied to a boiler of the Scotch marine type. In this case the ash-conveyer 100 discharges into a screw conveyer 101, which leads to the front of the boiler.

I claim as my invention—

1. In an automatic stoker, the combination, with a suitable supporting-frame, of hollow fuel supporting and feeding mechanism carried thereby adapted to feed the fuel from one end to the other thereof, suitable supports for said frame by which it is adapted to be readily projected into or withdrawn from coöperative relation with a boiler, and means for creating a current of cooling liquid through said hollow fuel-supporting members without communication with the fuel-supporting face thereof.

2. In an automatic stoker, the combination with a suitable supporting-frame, of a pair of reciprocating rams each composed of a main body and a pair of substantially horizontal vertically-separated fingers, the fingers of each ram being provided with horizontal extensions adapted to lie between the fingers of the other ram, and means for horizontally reciprocating the rams of one set and vertically reciprocating the rams of the other set.

3. In an automatic stoker, the combination, with a suitable supporting-frame, of a pair of hollow reciprocating rams each composed of a main body and a plurality of substantially horizontal vertically-separated hollow fingers the fingers of each ram being provided with horizontal hollow extensions adapted to lie between the fingers of the other ram, means for reciprocating said rams, and means for creating a circulation of cooling fluid therethrough.

4. In an automatic stoker, the combination, with a suitable supporting-frame, of a pair of hollow reciprocating rams each composed of a main body and a plurality of substantially horizontal vertically-separated hollow fingers the fingers of each ram being provided with horizontal hollow extensions adapted to lie between the fingers of the other ram, means for reciprocating said rams, a series of baffle-plates arranged within the hollow body of each ram and each extending into one of the substantially horizontal fingers, and means for creating a circulation of cooling fluid therethrough.

5. In an automatic stoker, the combination, with a suitable supporting-frame, of two sets of inclined rams each provided with a series of substantially horizontal vertically-separated fingers with transverse extensions projecting between the fingers of an adjacent ram, and means for vertically and horizontally reciprocating the rams of one set.

6. In an automatic stoker, the combination, with a suitable supporting-frame, of two sets of inclined rams each provided with a series of substantially horizontal vertically-separated fingers with transverse extensions projecting between the fingers of an adjacent ram, means for horizontally reciprocating the rams of one set, and means for horizontally and vertically reciprocating the rams of the other set.

7. In an automatic stoker, the combination, with a suitable supporting-frame, of a pair of reciprocating rams each provided with substantially horizontal vertically-separated fingers coöperating with the fingers of the other ram, a track arranged near each end of one ram and substantially parallel with the fingers thereof and adapted to engage and support the ram, means for reciprocating the ram along said tracks, and means for raising and lowering said tracks.

8. In an automatic stoker, the combination, with a suitable supporting-frame, of a pair of coöperating fuel-supporting rams carried thereby, a pair of tracks one arranged near the upper end of one ram and the other arranged near the lower end of said ram, said tracks arranged to engage said ram, means for reciprocating said ram along said tracks, and means for raising and lowering said tracks.

9. A fuel supporting and feeding ram consisting of, a main hollow body having a plurality of substantially parallel vertically-separated hollow fuel supporting and feeding fingers projecting therefrom, and a series of baffle-plates mounted in said ram and one extending into each of the fingers, an inlet leading into the ram at one end, and an outlet leading from said ram at the other end, for the purpose set forth.

10. An automatic stoker consisting of, a suitable supporting structure, hollow fuel supporting and feeding means carried by said frame and adapted to feed the fuel from one end to the other thereof, and means for maintaining a circulation of cooling liquid through said hollow fuel supporting and feeding means without communication with the fuel-supporting face thereof.

In witness whereof I have hereunto set my hand and seal, at Indianapolis, Indiana, this 24th day of May, A. D. 1904.

HENRY G. COX. [L. S.]

Witnesses:
ARTHUR M. HOOD.
JAMES A. WALSH.